United States Patent Office.

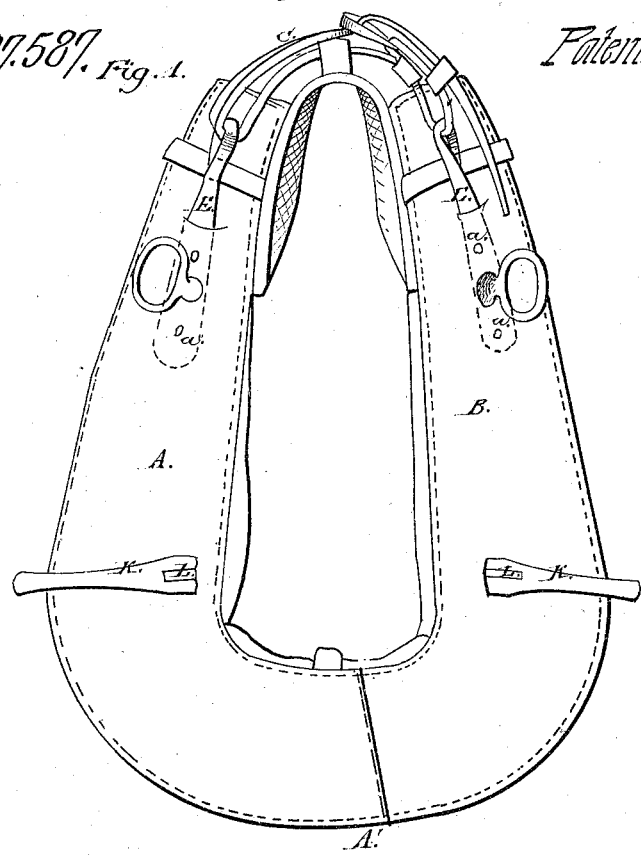
W. M. Baker,
Horse Collar:
No. 97,587. Fig. 1.
Patented Dec. 7, 1869.
Fig. 2.
Fig. 3.
Fig. 4.
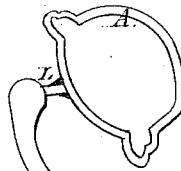
WITNESSES:
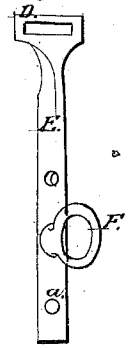
INVENTOR:
W. M. Baker

W. M. BAKER, OF GREENWICH STATION, OHIO.

Letters Patent No. 97,587, dated December 7, 1869.

IMPROVED HORSE-COLLAR.

The Schedule referred to in these Letters Patent and making part of the same.

*To all whom it may concern:*

Be it known that I, W. M. BAKER, of Greenwich Station, in the county of Huron, and State of Ohio, have invented certain new and useful Improvements in Horse-Collar and Hames; and I do hereby declare that the following is a full and complete description of the same, reference being had to the accompanying drawings, making a part of this specification, in which—

Figure 1 is a front view of the collar.
Figures 2, 3, and 4, detached sections.

Like letters of reference refer to like parts in the several views.

This invention has for its object the construction of a horse-collar in such way that it can be put on or taken off from the horse without passing it over the animal's head.

The breast part of the collar being made to open and secured while being worn by certain devices hereinafter shown.

Other improvements consist in the shape and arrangement of the tug-irons, and in the collar being so connected at the upper part that it may be adjusted to fit different size necks, all of which is hereinafter more fully described.

This collar is made in two sections, A B, and of the ordinary shape, size, and material.

The upper ends of the two sections are connected to each other by a strap and buckle, C, passed through the loop of the stays E, fig. 3.

Said stays are secured to the collar under the outer covering, by means of the line-rings F, which are screwed into the stay from the outside, as shown in fig. 1.

The lower ends of the two sections are connected to each other by a bar, G, fig. 4, one end of which is secured permanently to the inside of section B, whereas the other is allowed to project out from and into the corresponding section A.

On bringing the two ends together, and which are thus secured by a trip, H, sprung into one of the notches a, by means of the spring I, actuating the lever J, said lever being pivoted at b, the practical operation of which will presently be shown, the tugs or traces are attached to the collar by means of the tug-irons K, fig. 2, by the intervention of the standards L, to which they are pivoted, thereby obtaining to the said irons an easy and free movement in the direction of the traces.

It will be observed that the irons are so curved that they do not touch the collar, but are distant therefrom, so that there can be no abrasion or other defacing of the leather by contact therewith.

The standards L, referred to, are secured to the collar by means of a plate embedded in the inside, and into which it is loosely screwed, so that it possesses a freedom to turn therein, and thereby adapt the joint to the line of draught, and thus avoid all possible cramping of the same.

Collars, as usually made, are entire across the breast, and though the top is open and buckled together, it is always put on the horse by forcing it over the head, which is sometimes a matter of much trouble if the horse carries a high head, or is young and unaccustomed to the collar.

To avoid this difficulty and trouble, I make the collar open at the breast, so that it can be put on the animal without passing it over his head.

Thus, on pulling the ring A', the trip H becomes dislodged from the notch a, thereby disconnecting the two ends, which then may be spread out, and the collar thrown across the neck, which, on being done, the two ends are again connected by bringing them together and inserting the end of the bar G in the end of the opposite section.

The trip H springs into a notch, and thereby clamps the two sections securely together.

Should the collar be too wide or too narrow to properly fit the breast and shoulders of the horse, it can be adjusted by allowing the trip to engage in one other of the notches, as may be required.

By this means a large size collar can be fitted to a small size horse and per contra.

So also, if the collar is too deep or short for the animal's neck, it can be lengthened or shortened, as the case may be, by withdrawing the line-rings F, and then drawing out or pushing in the stays E, as may be required, to lengthen or shorten the collar, then again screwing in the ring into one or other of the series of holes a.

To collars in ordinary use, the traces are attached thereto by a loop and staple, and in such way that the loop to which the trace is connected, draws against and upon the collar, which, by its constant abrasion, soon defaces and wears holes therein.

To prevent such wearing, a piece of leather is sometimes secured between the face of the collar and loop, which not only adds to the expense of the collar, but it is also unsightly, and for a time only protects it, as it soon wears through and allows the iron to come in contact with the collar.

To avoid this difficulty, I make the connection of the tug with the collar, by means of the curved tug-irons K referred to, the curve of the iron being such that it cannot come in contact with the collar; hence there is no wearing or defacing of the same, as is unavoidable when the connection is made in the ordinary manner.

What I claim as my invention, and desire to secure by Letters Patent, is—

The collar A B, constructed with a stay, E, bar G, trip H, lever J, spring I, and tug-irons K, in the manner substantially as and for the purpose set forth.

W. M. BAKER.

Witnesses:
J. H. BURRIDGE,
E. E. WAITE.